United States Patent
Blasenheim

(10) Patent No.: US 10,739,571 B2
(45) Date of Patent: Aug. 11, 2020

(54) LENS DESIGN FOR SPECTROSCOPIC ELLIPSOMETER OR REFLECTOMETER

(71) Applicant: KLA-TENCOR CORPORATION, Milpitas, CA (US)

(72) Inventor: Barry Blasenheim, Campbell, CA (US)

(73) Assignee: KLA-Tencor Corporation, Milpitas, CA (US)

( * ) Notice: Subject to any disclaimer, the term of this patent is extended or adjusted under 35 U.S.C. 154(b) by 133 days.

(21) Appl. No.: 16/149,582

(22) Filed: Oct. 2, 2018

(65) Prior Publication Data

US 2019/0107697 A1 Apr. 11, 2019

Related U.S. Application Data

(60) Provisional application No. 62/571,106, filed on Oct. 11, 2017.

(51) Int. Cl.
| | |
|---|---|
| *G02B 17/00* | (2006.01) |
| *G02B 7/182* | (2006.01) |
| *G01N 21/21* | (2006.01) |
| *G01N 21/47* | (2006.01) |
| *G01N 21/95* | (2006.01) |
| *G01N 21/84* | (2006.01) |
| *G01N 21/93* | (2006.01) |

(52) U.S. Cl.
CPC ........... *G02B 17/00* (2013.01); *G01N 21/211* (2013.01); *G01N 21/47* (2013.01); *G01N 21/8422* (2013.01); *G01N 21/9501* (2013.01); *G02B 7/182* (2013.01); *G01N 21/93* (2013.01); *G01N 2021/213* (2013.01); *G01N 2201/0636* (2013.01)

(58) Field of Classification Search
CPC ...... G02B 17/00; G02B 7/182; G01N 21/211; G01N 21/47; G01N 21/8422; G01N 21/9501; G01N 21/93; G01N 2021/213; G01N 2201/0636
See application file for complete search history.

(56) References Cited

U.S. PATENT DOCUMENTS

| | | | |
|---|---|---|---|
| 4,619,502 A * | 10/1986 | Bagby | G02B 17/0631 359/366 |
| 5,608,526 A | 3/1997 | Piwonka-Corle et al. | |
| 5,859,424 A | 1/1999 | Norton et al. | |
| 6,246,045 B1 | 6/2001 | Morris et al. | |

(Continued)

FOREIGN PATENT DOCUMENTS

CN 106052869 A 10/2016

OTHER PUBLICATIONS

ISA/KR, International Search Report for PCT/US2018/054787 dated Feb. 27, 2019.

(Continued)

*Primary Examiner* — Wen Huang
(74) *Attorney, Agent, or Firm* — Hodgson Russ LLP

(57) ABSTRACT

A lens system includes a curved primary mirror and an aspheric secondary mirror. The aspheric secondary mirror has a diameter smaller than that of the primary mirror and shares an optical axis with the primary mirror. The aspheric secondary mirror and the primary mirror are rotationally symmetric with respect to the optical axis. A support member, which may be transparent over an operating wavelength of the lens system, is disposed on the aspheric secondary mirror.

20 Claims, 7 Drawing Sheets

(56) References Cited

U.S. PATENT DOCUMENTS

| | | | |
|---|---|---|---|
| 6,429,943 | B1 | 8/2002 | Opsal et al. |
| 7,478,019 | B2 | 1/2009 | Zangooie et al. |
| 7,933,026 | B2 | 4/2011 | Opsal et al. |
| 9,915,522 | B1 | 3/2018 | Jiang et al. |
| 2004/0233437 | A1 | 11/2004 | Horie |
| 2007/0121104 | A1 | 5/2007 | Hendrix et al. |
| 2007/0256726 | A1* | 11/2007 | Fork ............... H01L 31/052 |
| | | | 136/246 |
| 2014/0172394 | A1 | 6/2014 | Kuznetsov et al. |
| 2014/0222380 | A1 | 8/2014 | Kuznetsov et al. |
| 2015/0204664 | A1 | 7/2015 | Bringoltz et al. |
| 2016/0139032 | A1 | 5/2016 | Rampoldi et al. |

OTHER PUBLICATIONS

Edmund Optics, High Performance ReflX™ Objectives, retrieved Oct. 2, 2018, found at https://www.edmundoptics.com/f/High-Performance-ReflX-Objectives/13550/.

* cited by examiner

LENS DESIGN FOR SPECTROSCOPIC ELLIPSOMETER OR REFLECTOMETER

CROSS-REFERENCE TO RELATED APPLICATIONS

This application claims priority to the provisional patent application filed Oct. 11, 2017 and assigned U.S. App. No. 62/571,106, the disclosure of which is hereby incorporated by reference.

FIELD OF THE DISCLOSURE

This disclosure relates to lens systems.

BACKGROUND OF THE DISCLOSURE

Evolution of the semiconductor manufacturing industry is placing greater demands on yield management and, in particular, on metrology and inspection systems. Critical dimensions continue to shrink, yet the industry needs to decrease time for achieving high-yield, high-value production. Minimizing the total time from detecting a yield problem to fixing it determines the return-on-investment for a semiconductor manufacturer.

Fabricating semiconductor devices, such as logic and memory devices, typically includes processing a semiconductor wafer using a large number of fabrication processes to form various features and multiple levels of the semiconductor devices. For example, lithography is a semiconductor fabrication process that involves transferring a pattern from a reticle to a photoresist arranged on a semiconductor wafer. Additional examples of semiconductor fabrication processes include, but are not limited to, chemical-mechanical polishing (CMP), etch, deposition, and ion implantation. Multiple semiconductor devices may be fabricated in an arrangement on a single semiconductor wafer and then separated into individual semiconductor devices.

Metrology may be used during semiconductor manufacturing to take various measurements of, for example, a semiconductor wafer or reticle. Metrology tools can be used to measure structural and material characteristics associated with various semiconductor fabrication processes. For example, the metrology tools can measure material composition or can measure dimensional characteristics of structures and films such as film thickness, critical dimension (CD) of structures, or overlay. These measurements are used to facilitate process controls and/or yield efficiencies during the manufacture of semiconductor dies.

As semiconductor device pattern dimensions continue to shrink, smaller metrology targets are often required. Furthermore, the requirements for measurement accuracy and matching to actual device characteristics increase the need for device-like targets as well as in-die and even on-device measurements. Various metrology implementations have been proposed to achieve that goal. For example, focused beam ellipsometry based on primarily reflective optics has been proposed. Apodizers can be used to mitigate the effects of optical diffraction causing the spread of the illumination spot beyond the size defined by geometric optics. The use of high-numerical-aperture tools with simultaneous multiple angle-of-incidence illumination is another way to achieve small-target capability.

Other measurement examples may include measuring the composition of one or more layers of the semiconductor stack, measuring certain defects on (or within) the wafer, and measuring the amount of photolithographic radiation exposed to the wafer. In some cases, a metrology tool and algorithm may be configured for measuring non-periodic targets.

FIG. 1 is a schematic showing the collection lens and focus lens configuration of an exemplary ellipsometer. The design of FIG. 1 has high amounts of aberrations. The spot may need to be as small as possible, but aberrations increase the size of the focused spot.

FIG. 1 illustrates an off-axis design. The off-axis design eliminates symmetry in the system. Symmetrical systems tend to be easier to calibrate, and the symmetry allows for assumptions that can make calculations faster. The off-axis design has angles of incidence (AOI) that are higher than an on-axis design of the same numerical aperture (NA). When light reflects at non-normal incidence, it changes the polarization. Having the optics change the polarization state of the light may be a problem because the system of FIG. 1 is used to measure polarization.

FIG. 2 shows how the polarization changes as the angle of incidence changes. The magnitude of the change varies with wavelength, but the basic functional form is quadratic. In other words, if the AOI is reduced by 2×, the polarization change will be reduced by 4×.

Besides the angles of incidence, the lens and mirrors also can affect the polarization. Different rays can have different polarization shifts, which can make calibration challenging. Calibration can lower the accuracy and/or precision of a tool whereas a more accurate polarization can provide better measurements.

A Schwarzschild lens is an objective lens with two spherical mirrors. An example is illustrated in FIG. 3 with a ray trace. For the same NA, the maximum angles of incidence are smaller than the design of FIG. 1. Given the quadratic nature of the polarization shift versus AOI, this is an improvement over FIG. 1. The Schwarzschild lens is rotationally symmetric. As a result of the rotational symmetry, simulations and analysis using the Schwarzschild design require less computing time, and the calibration is simpler.

However, the Schwarzschild lens has limitations. The central obscuration and the legs will block about 25% of the light going through the lens. The central obscuration and the legs also cause extra diffraction relative to the design of FIG. 1. This increases the spot size for a given NA. The effects of the central obscuration and legs have on encircled energy is shown in FIG. 4.

FIG. 4 shows that, to get the same encircled energy as the existing design, the NA needs to be increased by 1.85×. Increasing the NA that much also increases the maximum AOI. As a result, increasing the NA that much almost eliminates the AOI advantage gained by going to an on-axis design.

While the Schwarzschild lens of FIG. 3 is better than the design of FIG. 1, the improvements tend to be small. Increasing the NA by 1.85× can cause other problems that, while different, can be just as detrimental to the system performance.

Therefore, what is needed is an improved lens system that addresses the limitations of the Schwarzschild lens.

BRIEF SUMMARY OF THE DISCLOSURE

A lens system is provided in a first embodiment. The lens system comprises a primary mirror that is curved, an aspheric secondary mirror that has a diameter smaller than that of the primary mirror, and a support member disposed on the aspheric secondary mirror. The aspheric secondary mirror shares an optical axis with the primary mirror. The aspheric secondary mirror and the primary mirror are rotationally symmetric with respect to the optical axis. The support member is transparent over an operating wavelength of the lens system.

The support member may be glass. For example, the support member may be silica or $CaF_2$.

In an instance, the lens system further includes a housing. The primary mirror and the aspheric secondary mirror are disposed in the housing. The support member connects the aspheric secondary mirror to the housing.

The diameter of the aspheric secondary mirror may be 2.5% to 20% of a diameter of the primary mirror.

The support member may have a non-zero convex radius of curvature of and a non-zero concave radius of curvature.

The aspheric secondary mirror can be configured to block 10% or less of light passing through the lens system.

A radius of curvature of the support member may be from 0.67× to 1.5× of a radius of the support member.

An ellipsometer or reflectometer can include the lens system of the first embodiment.

A method is provided in a second embodiment. A light beam is directed through a support member that is transparent over an operating wavelength of the light beam. The light beam reflects off a primary mirror. The light beam reflects off an aspheric secondary mirror that has a diameter smaller than that of the primary mirror. The aspheric secondary mirror is disposed on the support member. The aspheric secondary mirror shares an optical axis with the primary mirror. The aspheric secondary mirror and the primary mirror are rotationally symmetric with respect to the optical axis.

The aspheric secondary mirror can be configured to block 10% or less of light beam that is directed through the support element.

The light beam can be incident on the support member at normal incidence±2°.

The support member may be glass. For example, the support member may be silica or $CaF_2$.

The light beam may be used to perform metrology on a semiconductor wafer. For example, the light beam may be used to perform ellipsometry or reflectometry.

DESCRIPTION OF THE DRAWINGS

For a fuller understanding of the nature and objects of the disclosure, reference should be made to the following detailed description taken in conjunction with the accompanying drawings, in which.

DETAILED DESCRIPTION OF THE DISCLOSURE

Although claimed subject matter will be described in terms of certain embodiments, other embodiments, including embodiments that do not provide all of the benefits and features set forth herein, are also within the scope of this disclosure. Various structural, logical, process step, and electronic changes may be made without departing from the scope of the disclosure. Accordingly, the scope of the disclosure is defined only by reference to the appended claims.

Embodiments disclosed herein extend the capabilities of current ellipsometers by improving matching and making the calculations needed to analyze the raw data faster and easier. Various ellipsometer designs could benefit from these embodiments. For example, an ellipsometer with three different angles of incidence such as the Spectra Shape 10,000, also known as "SS10k," manufactured by KLA-Tencor Corporation, can be used to measure critical dimensions or other parameters on semiconductors. Such an ellipsometer can be used to measure thickness, index of refraction, or absorption of a thin film on a semiconductor wafer or other sample.

The focus lens and the collection lens are typically important optical components on an ellipsometer. The focus lens focuses the light into a small spot so small features can be measured. Light from the measurement spot also needs to be collected, which is the function of the collection lens. The focus and collection lenses typically modify the polarization as little as possible. The ellipsometer measures polarization changes caused by the wafer or other sample, and any polarization change caused by the optics is a systematic error that needs to be removed. Embodiments disclosed herein minimize or eliminate problems associated with the previous designs.

The polarization changes that occur in the lens may need to be simulated to be calibrated out. While this effect can be calibrated with enough experimental data and if the aperture is sampled with a dense enough grid, the required calculations are difficult and time-consuming even using state-of-the art computers. In addition, any measurements used to calibrate the system will have an error associated with them. As a result, reducing the AOI can produce a substantial improvement in computation time, calibration accuracy, and system precision.

Figure 5:
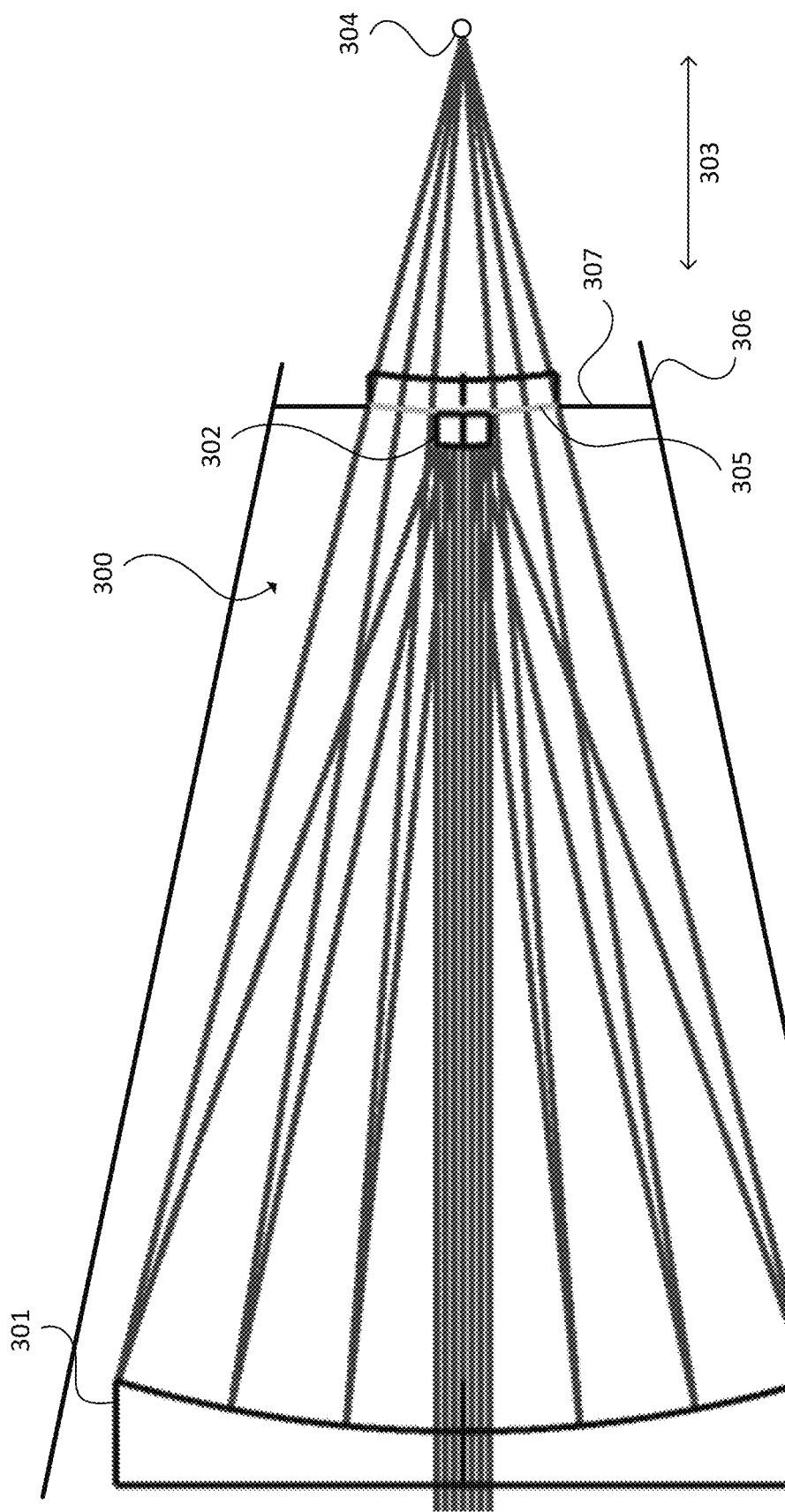
FIG. 5 is a schematic of a lens system in accordance with the present disclosure.

FIG. 5 is a schematic of a lens system 300. The lens system 300 includes a primary mirror 301 and an aspheric secondary mirror 302. Both the primary mirror 301 and the aspheric secondary mirror 302 are curved. The primary mirror 301 may have a radius of curvature from 100 mm to 150 mm, including all values to the 0.01 mm and ranges in between. The aspheric secondary mirror 302 may have a radius of curvature from 10 mm to 20 mm, including all values to the 0.01 and ranges in between. Other radii of curvature are possible. A ratio of the radius of curvature of the aspheric secondary mirror 302 to the radius of curvature of the primary mirror 301 may be from 0.06 to 0.2, include all values to the 0.01 and ranges in between. In an instance, the primary mirror 301 has a radius of curvature of 112.849 mm and the aspheric secondary mirror 302 has a radius of curvature of 15.099 mm with a conic constant of 0.2831. The radius of curvature of the aspheric secondary mirror 302 may be approximately 13% the radius of curvature of the primary mirror 301. This is merely one example, and other values are possible.

The aspheric secondary mirror 302 shares an optical axis 303 with the primary mirror 301. The optical axis 303 may be within the lens system 300 or may originate at the light source 304. The aspheric secondary mirror 302 and the primary mirror 301 are rotationally symmetric with respect to the optical axis 303.

Figure 1:
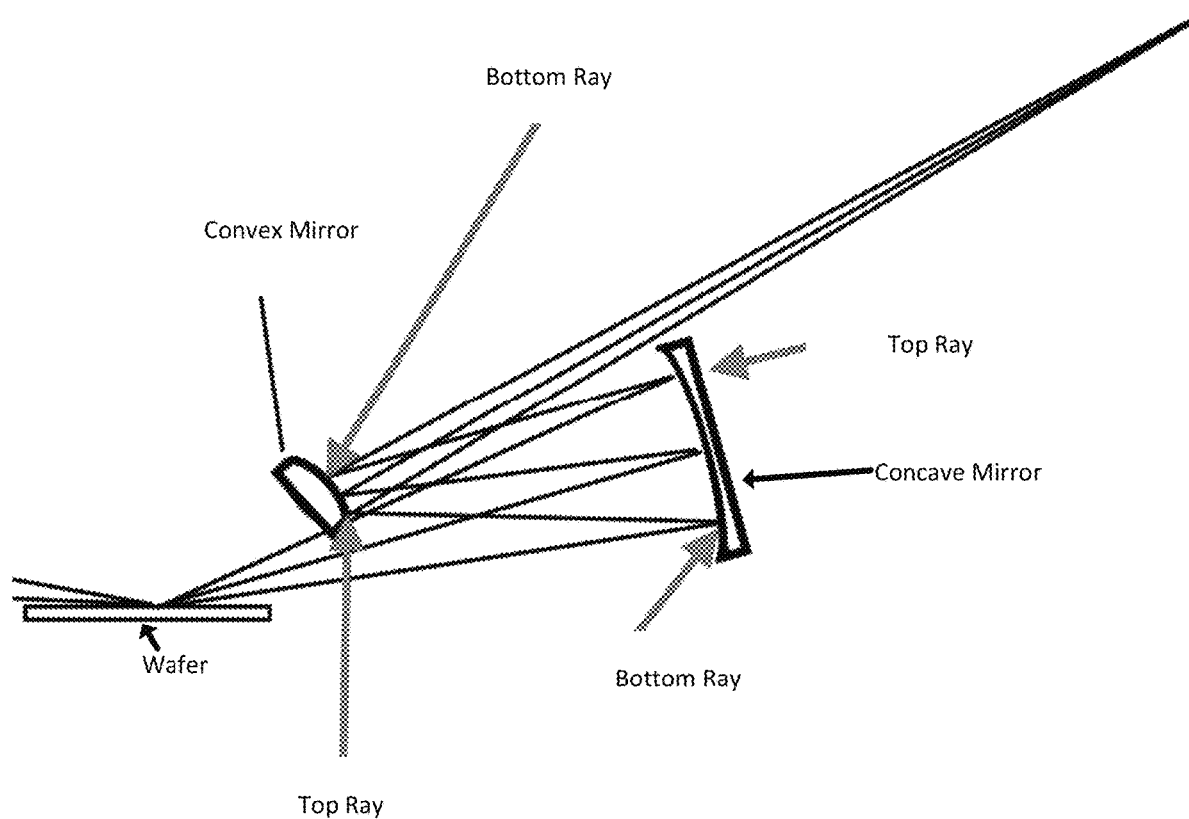
FIG. 1 is a schematic of an ellipsometer.
Figure 2:
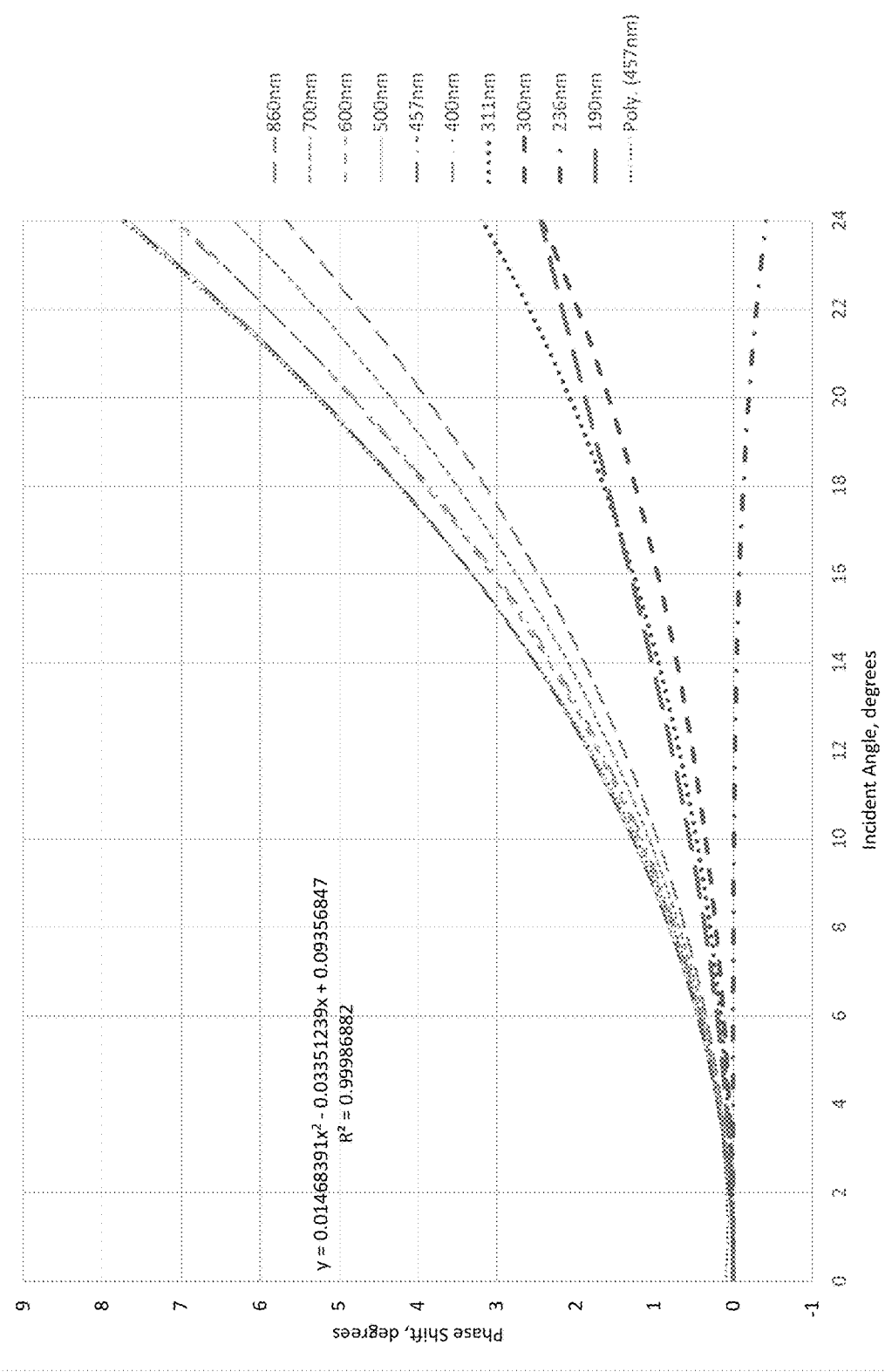
FIG. 2 is a chart illustrating phase shift versus angle of incidence.
Figure 3:
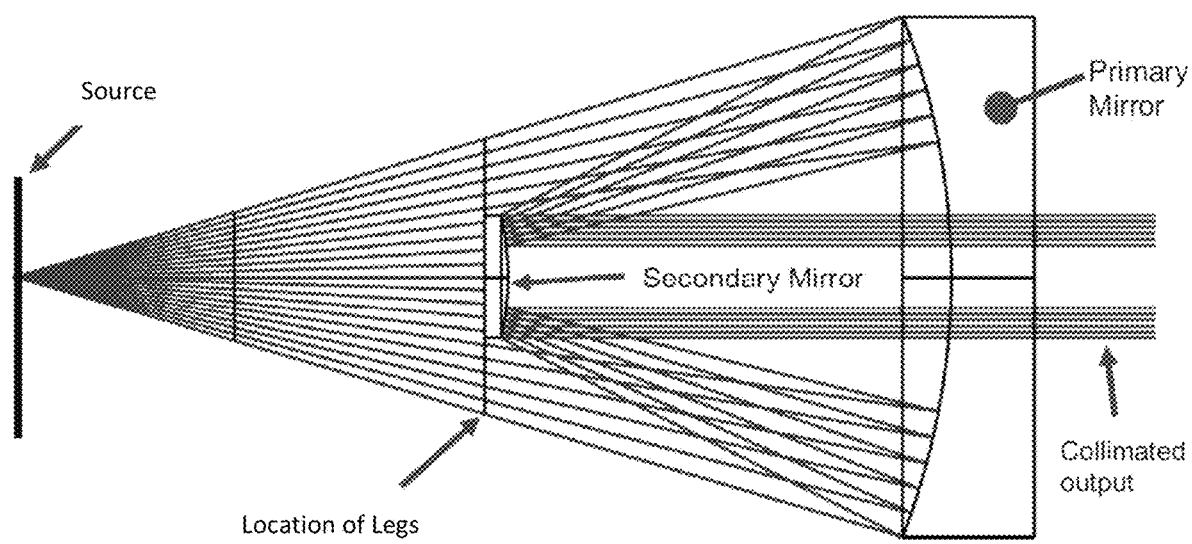
FIG. 3 is a schematic of a Schwarzschild lens.
Figure 4:
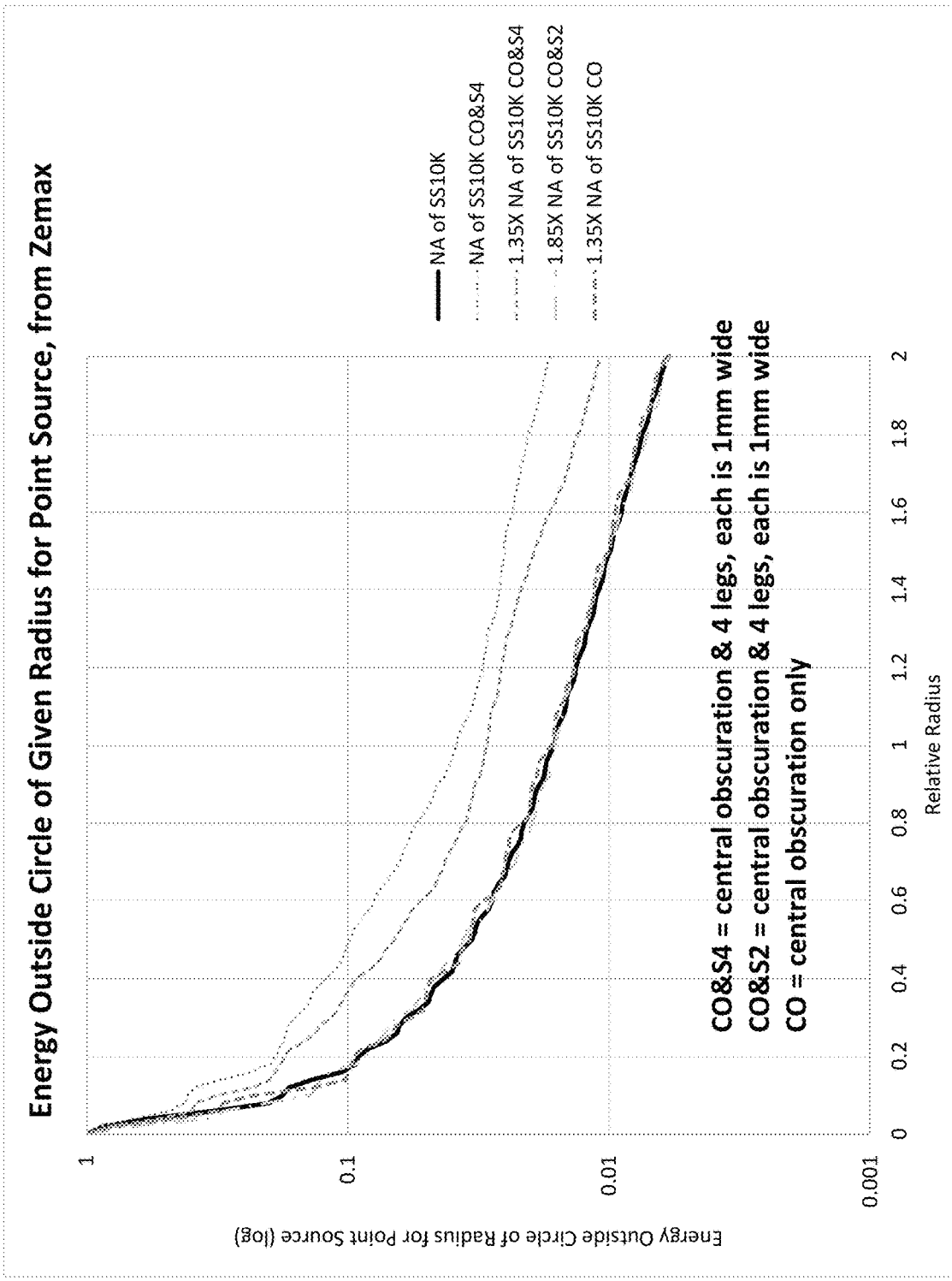
FIG. 4 is a chart illustrating energy outside circle of radius for point source versus relative radius.

The lens system 300 is close to normal incidence, which reduces the polarization shift as seen in FIG. 2. Thus, the lens system 300 has improved precision compared to other systems.

The aspheric secondary mirror 302 has a diameter smaller than that of the primary mirror 301. The primary mirror 301 may have a diameter from 50 mm to 80 mm, including all values to the 0.01 mm and ranges in between. The aspheric secondary mirror 302 may have a diameter from 2 mm to 10 mm, including all values to the 0.01 mm and ranges in between. In an instance, the primary mirror 302 has a diameter of 68±5 mm and the aspheric secondary mirror 302 has a diameter of 5±2.5 mm. Thus, the diameter of the aspheric secondary mirror 302 may be 2.5% to 20% that of the primary mirror 301, including all values and ranges in between. In an instance, the aspheric secondary mirror 302 has a diameter approximately 7.4% that of the primary mirror 301. This difference in diameters between the aspheric secondary mirror 302 and the primary mirror can reduce light blockage, which improves the performance of the lens system 300.

The lens system 300 can have a focal length from 2 mm to 15 mm. In an instance, the effective focal length is 9.8 mm.

The lens system 300 also includes a support member 305 that is disposed on the aspheric secondary mirror 302. The support member 305 is transparent over an operating wavelength of the lens system 300. For example, the support member 305 can be made out of glass or another material that transmits from deep ultraviolet (DUV) to infrared. For example, the support member 305 may be silica or $CaF_2$. The support member 305 can provide sufficient structural support to the aspheric secondary mirror 302 while minimizing the impact to light passing through the lens system 300.

In an instance, the support member 305 is a solid piece of material with a diameter, such as a window. The support member 305 may totally surround or otherwise be disposed around the aspheric secondary mirror 302. The support member 305 also may be a solid surface that the aspheric secondary mirror 302 is disposed on. Thus, the support member 305 may be a ring with the aspheric secondary mirror 302 in its center aperture or the support member may be a circle that the aspheric secondary mirror 302 is disposed on. The diameter of the support member 305 may be, for example, 20 mm. The support member 305 has a non-zero convex radius of curvature of and a non-zero concave radius of curvature. The convex radius of curvature and the concave radius of curvature can be from 30 mm to 60 mm, including all values to the 0.01 mm and ranges in between. In an instance, the support member 305 has a convex radius of curvature (side facing input) of 48.000 mm and a concave radius of curvature (side facing focus) of 45.198 mm. The configuration of the support member 305 may prevent spot size increase because the legs of the Schwarzschild lens are avoided.

The lens system 300 also can include a housing 306. The primary mirror 301 and the aspheric secondary mirror 302 can be disposed in the housing 306. Thus, the housing 306 can enclose the primary mirror 301 and the aspheric secondary mirror 302. The support member 305 can connect the aspheric secondary mirror 302 to the housing 306. For example, the support member 305 may be disposed on a support element 307, which may define an aperture that the support member 305 is positioned in.

The support member 305 have a shape that minimizes optical aberrations. The radius of curvature of the support member 305 may be configured so that light impinges the support member 305 at normal incidence, which reduces aberrations. For example, a light beam may be incident on the support member 305 at normal incidence±2°.

In an instance, the aspheric secondary mirror 302 is configured to block approximately 15% or less of light passing through the lens system 300. For example, the aspheric secondary mirror 302 may block approximately 10% or less of light passing through the lens system 300. Using a smaller mirror will reduce less light. However, previous designs like the Schwarzschild lens cannot reduce the size of the secondary mirror because this would cause aberrations that are unacceptably large. Using the design of FIG. 5, an aspheric secondary mirror 302 is used, which works over a wide enough range of field points to overcome these drawbacks.

The aspheric secondary mirror 302 is not spherical. Making the aspheric secondary mirror 302 an asphere allows it to be smaller without causing large aberrations. Making the mirror smaller has two advantages. First, the spot size increases due to smaller diffraction as the mirror becomes smaller. Second, as the mirror becomes smaller, the amount of light it blocks decreases. In an instance, the aspheric secondary mirror 302 only blocks approximately 10% of the light going through the lens system 300.

The support member 305 may be part of a curved window. The support member 305 can be configured to minimize aberrations. For example, the radii of both sides of the support member 305 can be concentric to the focal point. When this condition is met, the rays traveling through the support member 305 have a nearly zero angle relative to surface normal of the support member 305. This minimizes refraction, which minimizes chromatic and other types of aberrations. However, a reflection or "ghost" off of the support member 305 may occur. This ghost will focus in the same place as the main beam. One way to minimize this effect is to change the radii of curvature in the support member 305 so that the ghost is substantially out of focus. If the radius of curvature is from 0.67× to 1.5× of the radius, then the ghost will be out of focus, and the aberrations will still be low.

The lens system 300 causes less polarization error than a Schwarzschild lens. The lens system 300 also is rotationally symmetric, which can reduce the amount of computation needed for data analysis. The transparent support member 305 reduce the NA needed to achieve a given spot size compared to a traditional Schwarzschild lens. This in turn also simplifies data analysis and alignment. Furthermore, the aspheric secondary mirror 302 blocks less light than the small mirror in a Schwarzschild lens.

By reducing sources of error, embodiments of the lens system 300 can improve measurement accuracy and precision. New optical architectures with better matching and accuracy can be enabled.

Embodiments disclosed herein can be used in an ellipsometer or a reflectometer. Either the ellipsometer or reflectometer can be used to measure semiconductors.

Figure 6:
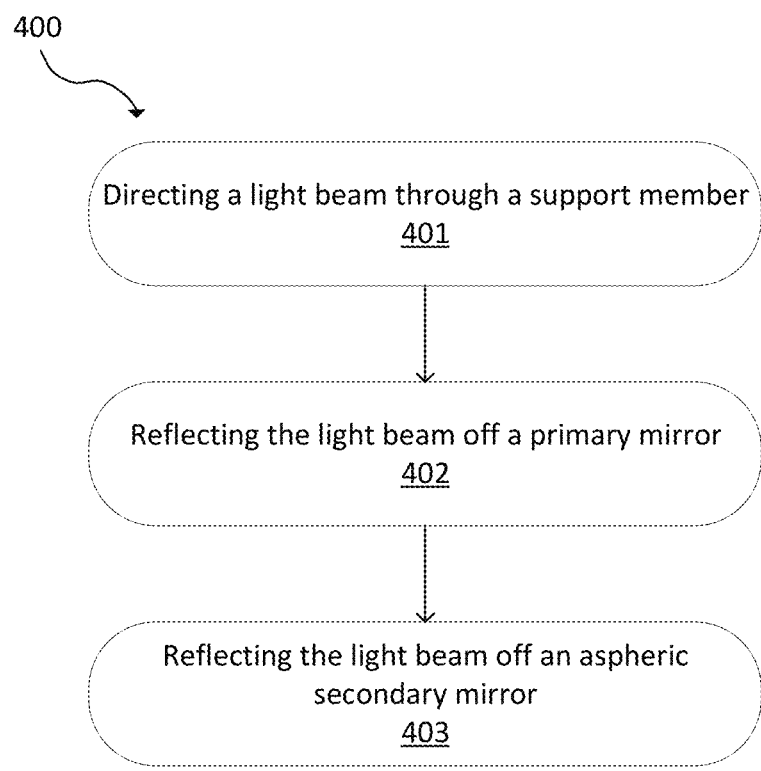
FIG. 6 is a flowchart of a method in accordance with the present disclosure.

FIG. 6 is a flowchart of a method 400. A light beam is directed through a support member at 401. The support member is transparent over an operating wavelength of the light beam. At 402, the light beam is reflected off a primary mirror. At 403, the light beam is reflected off an aspheric secondary mirror that has a diameter smaller than that of the primary mirror. The aspheric secondary mirror is disposed on the support member. The aspheric secondary mirror may be configured to block 10% or less of light beam that is directed through the support member.

The aspheric secondary mirror can share an optical axis with the primary mirror. The aspheric secondary mirror and the primary mirror can be rotationally symmetric with respect to the optical axis.

The light beam may be used to perform metrology on a semiconductor wafer. For example, the light beam can be used to perform ellipsometry or reflectometry.

Figure 7:
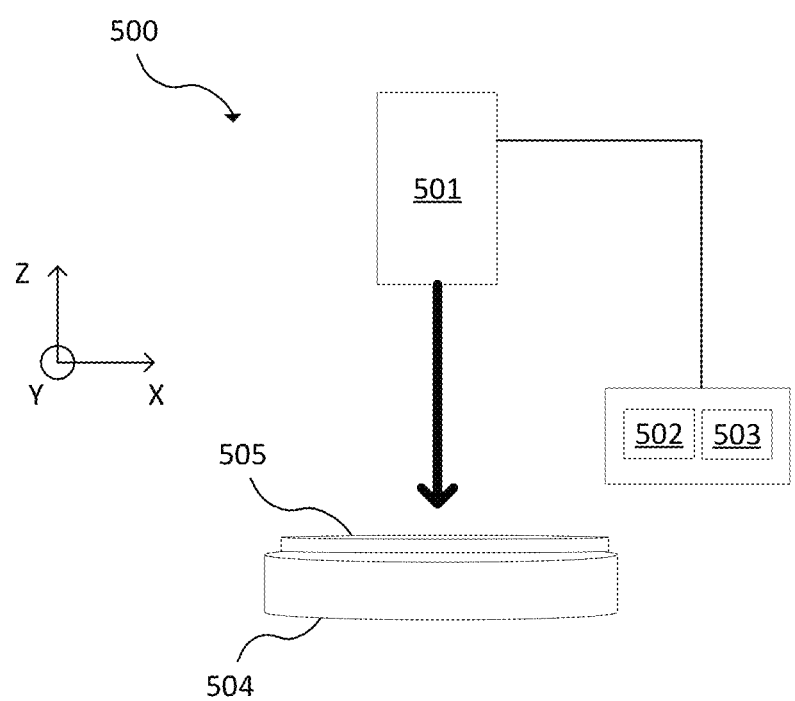
FIG. 7 is a block diagram of a system embodiment in accordance with the present disclosure.

FIG. 7 is a block diagram of a system 500. The measurement system 501 may produce a beam of light or may use other techniques to measure a surface of the wafer 505. In one example, the measurement system 501 includes a laser or a lamp. In another example, the wafer metrology tool 500 is a broad-band plasma inspection tool and the measurement system 501 includes a broad-band plasma source. The measurement system 501 can provide information about the wafer 505 or can provide information used to form images of the wafer 505. The wafer 505 may be on a stage 504.

In particular, the wafer metrology tool 500 or measurement system 501 can be configured to provide one or more of rotating polarizer rotating compensator spectroscopic ellipsometry data, full Mueller matrix components data, rotating polarizer spectroscopic ellipsometry data, reflectometry data, laser driven spectroscopic reflectometry data, or X-ray data.

The wafer metrology tool 500 can include an embodiments of the lens system 300.

In an instance, the wafer metrology tool 500 provides spectroscopic ellipsometry using a broadband light source, a measurement system 501 that measures how the light source interacts with the target, and processing algorithms that extract the relevant parameters of the target. In another instance, the source may be a laser driven light source, which can provide high intensities and increase the signal-to-noise ratio at the detector, as opposed to a Xe lamp. In an example, the collection system includes a series of polarizers (rotating or fixed), compensators (rotating or fixed), detectors, spectrometers, cameras, lenses, mirrors, and/or collimators. To enhance target signatures, the system may use $N_2$ or Ar gas purge to extend the wavelength range to 170 nm or below.

The wafer metrology tool 500 communicates with a processor 502 and an electronic data storage unit 503 in electronic communication with the processor 502. For example, the processor 502 can communicate with the measurement system 501 or other components of the wafer metrology tool 500. The processor 502 may be implemented in practice by any combination of hardware, software, and firmware. Also, its functions as described herein may be performed by one unit, or divided up among different components, each of which may be implemented in turn by any combination of hardware, software, and firmware. Program code or instructions for the processor 502 to implement various methods and functions may be stored in controller readable storage media, such as a memory in the electronic data storage unit 503, within the processor 502, external to the processor 502, or combinations thereof.

While only one processor 502 and electronic data storage unit 503 are illustrated, more than one processor 502 and/or more than one electronic data storage unit 503 can be included. Each processor 502 may be in electronic communication with one or more of the electronic data storage units 503. In an embodiment, the one or more processors 502 are communicatively coupled. In this regard, the one or more processors 502 may receive readings received at the measurement system 501 and store the reading in the electronic data storage unit 503 of the processor 502. The processor 502 and/or electronic data storage unit 503 may be part of the wafer metrology tool 500 itself or may be separate from the wafer metrology tool 500 (e.g., a standalone control unit or in a centralized quality control unit).

The processor 502 may be coupled to the components of the wafer metrology tool 500 in any suitable manner (e.g., via one or more transmission media, which may include wired and/or wireless transmission media) such that the processor 502 can receive the output generated by the wafer metrology tool 500, such as output from the measurement system 501. The processor 502 may be configured to perform a number of functions using the output. For instance, the processor 502 may be configured to measure layers on the wafer 505. In another example, the processor 502 may be configured to send the output to an electronic data storage unit 503 or another storage medium without reviewing the output. The processor 502 may be further configured as described herein.

The processor 502, other system(s), or other subsystem(s) described herein may take various forms, including a personal computer system, image computer, mainframe computer system, workstation, network appliance, internet appliance, or other device. The subsystem(s) or system(s) may also include any suitable processor known in the art, such as a parallel processor. In addition, the subsystem(s) or system(s) may include a platform with high speed processing and software, either as a standalone or a networked tool. For example, the processor 502 may include a microprocessor, a microcontroller, or other devices.

If the system includes more than one subsystem, then the different subsystems may be coupled to each other such that images, data, information, instructions, etc. can be sent between the subsystems. For example, one subsystem may be coupled to additional subsystem(s) by any suitable transmission media, which may include any suitable wired and/or wireless transmission media known in the art. Two or more of such subsystems may also be effectively coupled by a shared computer-readable storage medium (not shown).

The processor 502 also may be part of a defect review system, an inspection system, a metrology system, or some other type of system. Thus, the embodiments disclosed herein describe some configurations that can be tailored in a number of manners for systems having different capabilities that are more or less suitable for different applications.

The processor 502 may be in electronic communication with the measurement system 501 or other components of the wafer metrology tool 500. The processor 502 may be configured according to any of the embodiments described herein. The processor 502 also may be configured to perform other functions or additional steps using the output of the measurement system 501 or using images, measurements, or data from other sources.

In another embodiment, the processor 502 may be communicatively coupled to any of the various components or sub-systems of wafer metrology tool 500 in any manner known in the art. Moreover, the processor 502 may be configured to receive and/or acquire data or information from other systems (e.g., inspection results from an inspection system such as a review tool, another metrology tool, a remote database including design data and the like) by a transmission medium that may include wired and/or wireless portions. In this manner, the transmission medium may serve as a data link between the processor 502 and other subsystems of the wafer metrology tool 500 or systems external to wafer metrology tool 500.

In some embodiments, various steps, functions, and/or operations of wafer metrology tool 500 and the methods disclosed herein are carried out by one or more of the following: electronic circuits, logic gates, multiplexers, programmable logic devices, ASICs, analog or digital controls/switches, microcontrollers, or computing systems. Program instructions implementing methods such as those described herein may be transmitted over or stored on carrier medium. The carrier medium may include a storage medium such as a read-only memory, a random access memory, a magnetic or optical disk, a non-volatile memory, a solid state memory, a magnetic tape and the like. A carrier medium may include a transmission medium such as a wire, cable, or wireless transmission link. For instance, the various steps described throughout the present disclosure may be carried out by a single processor 502 (or computer system) or, alternatively, multiple processors 202 (or multiple computer systems). Moreover, different sub-systems of the wafer metrology tool 500 may include one or more computing or logic systems. Therefore, the above description should not be interpreted as a limitation on the present disclosure, but merely an illustration.

In an instance, the wafer metrology tool 500 in FIG. 7 may include an illumination system which illuminates a target; a measurement system 501 which captures relevant information provided by the illumination system's interaction (or lack thereof) with a target, device, or feature on the wafer 505; and a processor 502 which analyzes the information collected using one or more algorithms.

While illustrated as on the same axis in FIG. 7, the beam of light from a light source of the measurement system 501 may be directed at the wafer 505 at an angle and can be reflected from the wafer 505 to a detector of the measurement system 501 at a different angle.

The wafer metrology tool 500 can include one or more hardware configurations which may be used to measure the various semiconductor structural and material characteristics. Examples of such hardware configurations include, but are not limited to, a spectroscopic ellipsometer (SE); an SE with multiple angles of illumination; an SE measuring Mueller matrix elements (e.g., using rotating compensator(s)); a single-wavelength ellipsometers; a beam profile ellipsometer (angle-resolved ellipsometer); a beam profile reflectometer (angle-resolved reflectometer); a broadband reflective spectrometer (spectroscopic reflectometer); a single-wavelength reflectometer; an angle-resolved reflectometer; an imaging system; or a scatterometer (e.g., speckle analyzer). The hardware configurations can be separated into discrete operational systems or can be combined into a single tool.

The illumination system of certain hardware configurations can include one or more light sources. The light source may generate light having only one wavelength (i.e., monochromatic light), light having a number of discrete wavelengths (i.e., polychromatic light), light having multiple wavelengths (i.e., broadband light), and/or light the sweeps through wavelengths, either continuously or hopping between wavelengths (i.e., tunable sources or swept source). Examples of suitable light sources are: a white light source, an ultraviolet (UV) laser, an arc lamp or an electrode-less lamp, a laser sustained plasma (LSP) source, a supercontinuum source such as a broadband laser source, shorter-wavelength sources such as X-ray sources, extreme UV sources, or some combination thereof. The light source may also be configured to provide light having sufficient brightness, which in some cases may be a brightness greater than about 1 W/(nm cm$^2$ Sr). The wafer metrology tool 500 may also include a fast feedback to the light source for stabilizing its power and wavelength. Output of the light source can be delivered via free-space propagation, or in some cases delivered via optical fiber or light guide of any type.

The wafer metrology tool 500 may be designed to make many different types of measurements related to semiconductor manufacturing. For example, in certain embodiments the wafer metrology tool 500 may measure characteristics of one or more targets, such as CD, overlay, sidewall angles, film thicknesses, or process-related parameters (e.g., focus and/or dose). The targets can include certain regions of interest that are periodic in nature, such as gratings in a memory die. Targets can include multiple layers (or films) whose thicknesses can be measured by the wafer metrology tool 500. Targets can include target designs placed (or already existing) on the semiconductor wafer for use, such as with alignment and/or overlay registration operations. Certain targets can be located at various places on the semiconductor wafer. For example, targets can be located within the scribe lines (e.g., between dies) and/or located in the die itself. In certain embodiments, multiple targets are measured (at the same time or at differing times) by the same or multiple metrology tools. The data from such measurements may be combined. Data from the metrology tool can be used in the semiconductor manufacturing process, for example, to feed-forward, feed-backward, and/or feed-sideways corrections to the process (e.g., lithography, etch) and, therefore, can yield a complete process control solution.

To improve measurement accuracy and matching to actual device characteristics and to improve in-die or on-device measurements, various metrology implementations can be used. For example, focused beam ellipsometry based on primarily reflective optics can be used. Apodizers can be used to mitigate the effects of optical diffraction causing the spread of the illumination spot beyond the size defined by geometric optics. The use of high-NA tools with simultaneous multiple AOI illumination is another way to achieve small-target capability. Other measurement examples may include measuring the composition of one or more layers of the semiconductor stack, measuring certain defects on (or within) the wafer, and measuring the amount of photolithographic radiation exposed to the wafer. In some cases, a metrology tool and algorithm may be configured for measuring non-periodic targets.

Measurement of parameters of interest usually involves a number of algorithms. For example, optical interaction of the incident beam with the sample can be modeled using an electro-magnetic (EM) solver and can use algorithms such as rigorous coupled-wave analysis (RCWA), finite element method (FEM), method of moments, surface integral method, volume integral method, finite-difference time-domain (FDTD), and others. The target of interest is usually modeled (parametrized) using a geometric engine, or in some cases, process modeling engine or a combination of both. A geometric engine can be implemented, such as the AcuShape software product of KLA-Tencor Corporation.

Collected data can be analyzed by a number of data fitting and optimization techniques and technologies including: libraries; fast-reduced-order models; regression; machine-learning algorithms such as neural networks and support-vector machines (SVM); dimensionality-reduction algorithms such as principal component analysis (PCA), independent component analysis (ICA), and local-linear embedding (LLE); sparse representation such as Fourier or wavelet transform; Kalman filter; algorithms to promote matching from same or different tool types; and others. Collected data can also be analyzed by algorithms that do not include modeling, optimization and/or fitting.

Computational algorithms are usually optimized for metrology applications with one or more approaches being used such as design and implementation of computational hardware, parallelization, distribution of computation, load-balancing, multi-service support, or dynamic load optimization. Different implementations of algorithms can be done in firmware, software, field programmable gate array (FPGA), and programmable optics components, etc.

The data analysis and fitting steps usually pursue one or more goals. For example, the goal may be measurement of CD, sidewall angle (SWA), shape, stress, composition, films, bandgap, electrical properties, focus/dose, overlay, generating process parameters (e.g., resist state, partial pressure, temperature, and focusing model), and/or any combination thereof. The goal may be modeling and/or design of metrology systems. The goal also may be modeling, design, and/or optimization of metrology targets.

Embodiments of the present disclosure address the field of semiconductor metrology and are not limited to the hardware, algorithm/software implementations and architectures, and use cases summarized above.

Each of the steps of the method may be performed as described herein. The methods also may include any other step(s) that can be performed by the controller and/or computer subsystem(s) or system(s) described herein. The steps can be performed by one or more processors, which may be configured according to any of the embodiments described herein. In addition, the methods described above may be performed by any of the system embodiments described herein.

Although the present disclosure has been described with respect to one or more particular embodiments, it will be understood that other embodiments of the present disclosure may be made without departing from the scope of the present disclosure. Hence, the present disclosure is deemed limited only by the appended claims and the reasonable interpretation thereof.

What is claimed is:

1. A lens system comprising:
a primary mirror that is curved;
an aspheric secondary mirror that has an outer diameter smaller than an outer diameter of the primary mirror, wherein the aspheric secondary mirror shares an optical axis with the primary mirror, and wherein the aspheric secondary mirror and the primary mirror are rotationally symmetric with respect to the optical axis; and
a support member disposed on the aspheric secondary mirror, wherein the support member is transparent over an operating wavelength of the lens system, and wherein an outer diameter of the support member is larger than the outer diameter of the aspheric secondary mirror and smaller than the outer diameter of the primary mirror.

2. The lens system of claim 1, wherein the support member is glass.

3. The lens system of claim 1, wherein the support member is silica.

4. The lens system of claim 1, wherein the support member is $CaF_2$.

5. The lens system of claim 1, further comprising a housing, wherein the primary mirror and the aspheric secondary mirror are disposed in the housing, and wherein the support member connects the aspheric secondary mirror to the housing.

6. The lens system of claim 1, wherein the outer diameter of the aspheric secondary mirror is 2.5% to 20% of the outer diameter of the primary mirror.

7. The lens system of claim 1, wherein the support member has a non-zero convex radius of curvature of and a non-zero concave radius of curvature.

8. The lens system of claim 1, wherein the aspheric secondary mirror is configured to block 10% or less of light passing through the lens system.

9. The lens system of claim 1, wherein a radius of curvature of the support member is from 0.67× to 1.5× of a radius of the support member.

10. An ellipsometer that includes the lens system of claim 1.

11. A reflectometer that includes the lens system of claim 1.

12. A method comprising:
directing a light beam through a support member that is transparent over an operating wavelength of the light beam;
reflecting the light beam off a primary mirror; and
reflecting the light beam off an aspheric secondary mirror that has an outer diameter smaller than an outer diameter of the primary mirror, wherein the aspheric secondary mirror is disposed on the support member, wherein the aspheric secondary mirror shares an optical axis with the primary mirror, wherein the aspheric secondary mirror and the primary mirror are rotationally symmetric with respect to the optical axis, and wherein an outer diameter of the support member is larger than the outer diameter of the aspheric secondary mirror and smaller than the outer diameter of the primary mirror.

13. The method of claim 12, wherein the aspheric secondary mirror is configured to block 10% or less of light beam that is directed through the support element.

14. The method of claim 12, wherein the light beam is incident on the support member at normal incidence±2°.

15. The method of claim 12, wherein the support member is glass.

16. The method of claim 12, wherein the support member is silica.

17. The method of claim 12, wherein the support member is $CaF_2$.

18. The method of claim 12, wherein the light beam is used to perform metrology on a semiconductor wafer.

19. The method of claim 18, wherein the light beam is used to perform ellipsometry.

20. The method of claim 18, wherein the light beam is used to perform reflectometry.

* * * * *